United States Patent
Bengtsson

(10) Patent No.: US 9,974,078 B2
(45) Date of Patent: May 15, 2018

(54) PILOT RESOURCE ALLOCATION FOR A MIMO SYSTEM

(71) Applicant: Sony Mobile Communications Inc., Tokyo (JP)

(72) Inventor: Erik Bengtsson, Eslöv (SE)

(73) Assignee: Sony Mobile Communications Inc., Tokyo (JP)

(*) Notice: Subject to any disclaimer, the term of this patent is extended or adjusted under 35 U.S.C. 154(b) by 109 days.

(21) Appl. No.: 15/099,996

(22) Filed: Apr. 15, 2016

(65) Prior Publication Data

US 2017/0118757 A1    Apr. 27, 2017

Related U.S. Application Data

(63) Continuation of application No. PCT/EP2015/074806, filed on Oct. 27, 2015.

(51) Int. Cl.
*H04W 72/04* (2009.01)
*H04W 4/02* (2018.01)
(Continued)

(52) U.S. Cl.
CPC ......... *H04W 72/0453* (2013.01); *H04B 7/00* (2013.01); *H04B 7/0413* (2013.01);
(Continued)

(58) Field of Classification Search
None
See application file for complete search history.

(56) References Cited

U.S. PATENT DOCUMENTS 7,599,698 B2 * 10/2009 Cheng ............... H04W 8/24
                                                      455/450
9,184,511 B2 * 11/2015 Ma ................... H01Q 25/00
(Continued)

FOREIGN PATENT DOCUMENTS

EP      2 924 908 A1      9/2015
WO    WO 2015/149812 A1   10/2015

OTHER PUBLICATIONS

International Search Report and Written Opinion of the International Searching Authority, Application No. PCT/EP2015/074806, dated Jun. 30, 2016 (14 pp.).

*Primary Examiner* — Candal Elpenord
(74) *Attorney, Agent, or Firm* — Myers Bigel, P.A.

(57) ABSTRACT

The present application relates to a method of allocating resources for transmission of pilot signals of a plurality of terminals of a cellular multiple-input and multiple-output system. The cellular MIMO system comprises a base station having a plurality of antennas and a logic which analyzes pilot signals received from a terminal at the plurality of antennas to obtain information about a radio channel property of the radio channel between the terminal and the plurality of antennas. According to the method, the base station determines whether the radio channel property between the terminal and the plurality of antennas is constant over a period of time. If the radio channel property is constant over a period of time, receiving parameters of the plurality of antennas are configured for nulling pilot signals from the terminal, and a resource, which is assigned to the terminal for a transmission of pilot signals, is assigned to another terminal.

13 Claims, 2 Drawing Sheets

(51) Int. Cl.
*H04W 4/04* (2009.01)
*H04L 5/00* (2006.01)
*H04B 7/04* (2017.01)
*H04B 7/0413* (2017.01)
*H04B 7/00* (2006.01)

(52) U.S. Cl.
CPC ............ *H04L 5/005* (2013.01); *H04W 4/027* (2013.01); *H04W 4/04* (2013.01); *H04W 72/042* (2013.01); *H04W 72/0413* (2013.01); *H04L 5/00* (2013.01)

(56) References Cited

U.S. PATENT DOCUMENTS

| | | | |
|---|---|---|---|
| 2006/0135169 A1* | 6/2006 | Sampath | H04L 25/0222 455/447 |
| 2008/0212700 A1* | 9/2008 | Han | H04L 1/0625 375/260 |
| 2008/0285477 A1* | 11/2008 | Kuroda | H04L 1/0026 370/252 |
| 2011/0134747 A1* | 6/2011 | Kwon | H04L 1/0028 370/208 |
| 2011/0182375 A1* | 7/2011 | Kim | H04W 72/0426 375/260 |
| 2012/0329498 A1* | 12/2012 | Koo | H04J 11/005 455/501 |
| 2013/0294351 A1* | 11/2013 | Kwon | H04W 24/10 370/328 |
| 2015/0180561 A1 | 6/2015 | Jindal | |

* cited by examiner

PILOT RESOURCE ALLOCATION FOR A MIMO SYSTEM

FIELD OF THE INVENTION

The present invention relates to cellular communication systems, in particular, to methods and devices for a resource allocation for a transmission of pilot signals in a cellular multiple-input and multiple-output (MIMO) system.

BACKGROUND OF THE INVENTION

Mobile data and voice communication continues to grow. The increasing popularity of data and voice communication requires that communication needs of a large number of users must be met which are all located within a small area, a case referred to as dense crowd scenario in the art. Typical examples include sports arenas, shopping malls or large office buildings.

In order to increase data transmission performance and reliability, the so-called multiple-input and multiple-output (MIMO) technology may be used in a wireless radio telecommunication system for transmitting information between a base station and terminals of users.

MIMO systems may use multiple send and receive antennas for wireless communication at a base station. The MIMO technology forms the basis for coding techniques which use the temporal as well as the spatial dimension for transmitting information. The enhanced coding provided in MIMO systems allows a spectral and energy efficiency of the wireless communication to be increased.

In a so-called massive MIMO system, the base station may include a large number of antennas, for example several tens or even in excess of one hundred antennas with associated receiver circuitry. The extra antennas of the massive MIMO base station allow radio energy to be spatially focussed in transmissions as well as a directional sensitive reception which improves spectral efficiency and radiated energy efficiency.

In order to adapt the transmit signal at each individual antenna of the base station in accordance with the currently active receiving terminals, a base station logic needs information about radio channel properties between the terminals and the antennas.

A pilot signalling scheme can be used for this purpose which allows the base station to set configuration antenna parameters for transmitting signals, so as to focus radio energy at terminals or for receiving radio signals. Thus, focus may mean both phase align contributions with different path length and transmit only in directions that will reach the terminal. In a conventional MIMO system, training sequences may be transmitted from all terminals within the cell and possibly also neighbouring cells in a time slot which is dedicated to the respective terminal. The training sequences need to be orthogonal in order for the base station to identify the configuration parameters for the plurality of antennas for each of the one of the terminals in conventional systems. Orthogonality may be achieved by using time division multiple access (TDMA), code division multiple access (CDMA) or frequency division multiple access (FDMA) technologies or a combination thereof.

In case the MIMO system uses time division multiple access (TDMA), each terminal can transmit a pilot signal in an assigned time slot, which can be received by the antennas and analysed by the base station logic. It will be appreciated that time slots are one example of orthogonal channels, with orthogonality being attained in the time domain. In order to not interfere with each other, a certain time period can be assigned in each system frame where each terminal may transmit its pilot signal. The time slots in which terminals may transmit their pilot signals in combination are also referred to as pilot portion of the frame. The remaining time slots of the frame may be used for downlink (DL) and uplink (UL) data transmission, with the downlink and uplink transmissions being performed in a plurality of time slots which may follow the header of the frame. The pilot signals may each include a training sequence with the pilot signal received at the plurality of antennas of the base station being analysed by the base station logic. Information about a radio channel property of the radio channel between the terminal and the plurality of antennas may be obtained as a result of the analysis. The base station may use the results of the analysis to determine configuration parameters for transmitting signals via the antennas to the respective terminals.

In particular, massive MIMO systems (MaMi) may be deployed in buildings such as office buildings, shopping malls, sports arenas or other areas in which a large density of users can occur. In such environments, a large number of terminals may be located in a cell served by the MIMO base station. The time required for the pilot signalling of the terminals in each frame may increase with the number of terminals. For a large number of terminals, the time required for all terminals to transmit their pilot signals may exceed the available pilot signalling time in each frame. While the pilot signalling time, i.e. the number of time slots allocated to the pilot signalling, may be adjusted dynamically, the transmission of payload data would be negatively effected if the pilot signalling time was increased too much. Therefore, the resources for transmitting pilot signals are limited.

The pilot signals are send from the terminals to the MIMO base station, i.e., in the uplink direction. Therefore, uplink and downlink data transmissions are based on the quality of the uplink pilot signal. If there is interference during the pilot signal transmission, both uplink and downlink would be effected. The interference may originate from neighbour cells. Furthermore, for mobility reasons, the validity of the channel as defined by the configuration parameters is limited.

A new pilot signal needs to be transmitted at regular terms, for example at about every millisecond. Therefore, the transmission of pilot signals requires an considerable amount of resources. In order to keep the ratio between payload and pilot signal overhead large, the number of orthogonal pilot channels needs to be kept as small as possible.

SUMMARY OF THE INVENTION

In view of the above, there is a need in the art for methods and devices which address at least some of the above short comings of conventional MIMO systems. There is in particular a need in the art for allocating resources for pilot signalling to terminals of a multiple-input and multiple-output (MIMO) system, in which resources for pilot signalling are limited due to the large number of terminals and interference from neighbouring cells may be expected.

According to the present invention, this object is achieved by the features of the independent claims. The dependent claims define preferred and advantageous embodiments of the invention.

According to an embodiment of the invention, a method for allocating resources for a transmission of pilot signals of a plurality of terminals of a cellular multiple-input and multiple-output (MIMO) system is provided. The cellular MIMO system comprises a base station comprising a plurality of antennas and a logic which analyses pilot signals received from a terminal at the plurality of antennas to obtain information about a radio channel property of the radio channel between the terminal and the plurality of antennas. According to the method, the base station determines whether the radio channel property between the terminals and the plurality of antennas is constant over a period of time. If the base station determines that the radio channel property between the terminal and the plurality of antennas is constant over a period of time, the base station configures receiving parameters of the plurality of antennas of the base station for nulling pilot signals from the terminal. Furthermore, in case the base station has determined that the radio channel property between the terminal and the plurality of antennas is constant over a period of time, the base station allocates a resource, which is assigned to the terminal for the transmission of pilot signals of the terminal, to another terminal for a transmission of pilot signals of the other terminal. In other words, in case the base station detects that a radio channel property to a specific terminal does not vary over a period of time, for example because the terminal is a stationary terminal, the base station configures its receiving parameters such that pilot signals from this terminal are rejected or ignored in order to be able to reuse the pilot signals resource for transmitting pilot signals from another terminal. In particular, when a massive MIMO transmission scheme is used in congested areas, such as office environments, shopping malls and so on, where a lot of devices or terminals need access at the same time, the above-described method may be used to assign the limited resources for transmitting pilot signals efficiently. A terminal, which is expected to have a constant radio channel property with respect to the plurality of antennas of the base station is ignored by the base station by nulling pilot signals from the terminal. Nulling is a technique used to make a massive MIMO antenna array blind to signals originating from specific devices, for example from a specific device which is arranged in a specific direction and a specific distance to the plurality of antennas of the base station.

Based on the fact that if a terminal is stationary or a radio channel between the terminal and the base station does not vary significantly, pilot signals do not need to be transmitted with the same intensity or frequency and will be valid for a longer time. This enables the base station to null pilot signals from a stationary terminal during the pilot signal transmission phase and to reuse the resource for transmitting pilot signals for another terminal without contaminating or interfering the pilot signal transmission from the other terminal. Such, a "digital" shield in the direction to the stationary terminal is created and the resource of the pilot channel used by the terminal may be assigned by the base station to another terminal.

According to an embodiment, the base station may determine whether the radio channel property between the terminal and the plurality of antennas is constant over a period of time by receiving a movement information from the terminal at the base station. The movement information indicates whether the terminal is moving or is stationary. Depending on the movement information, the base station determines that the radio channel property between the terminal and the plurality of antennas is constant over a period of time. The terminal may for example determine its moving state with sensors of the terminal, for example an accelerometer or a receiver for receiving signals from a global positioning system (GPS). Based on this sensor data, the terminal may indicate if it is currently moving or not. As an alternative, the terminal may determine a movement direction and speed of the terminal, for example with the above-described sensors. The movement direction and speed of the terminal may be indicated in the movement information transmitted from the terminal and received at the base station. The base station may compare the movement information from the terminal with the movement direction and speed of the base station and may determine that the radio channel property between the terminal and the plurality of antennas is constant over a period of time depending on this comparison. In particular, if the comparison shows that the base station and the terminal are moving in the same direction at the same speed, the base station may determine that the radio channel property between the terminal and the plurality of antennas is constant over a period of time. Such a condition may be present in a base station and terminal arranged in a train or a ship.

According to another embodiment of the present invention, the base station may determine whether the radio channel property between the terminal and the plurality of antennas is constant over a period of time by receiving a constant channel information from a further base station. The constant channel information from the further base station indicates that a radio channel property between the terminal and a plurality of antennas of the further base station is constant over a period of time. Depending on the constant channel information, the base station determines that the radio channel property between the terminal and the plurality of antennas of the base station is constant over a period of time. For example, if the terminal is arranged such that it is covered by the cell of the base station and the cell of the further base station, the further base station may determine whether the radio channel property between the terminal and the plurality of antennas of a further base station is constant over a period of time, for example as the terminal is a stationary terminal. This information may be forwarded from the further base station to the base station such that the base station can use this information for nulling pilot signals from the terminal and for reallocating the resource assigned to the terminal for a transmission of pilot signals to another terminal. For example, the terminal may be registered at the further base station and may have transmitted movement information to the further base station, such that the further base station can easily determine whether the radio channel property between the terminal and the plurality of antennas of the further base station is constant over a period of time.

According to another embodiment, the base station may determine whether the radio channel property between the terminal and the plurality of antennas is constant over a period of time by determining a temporal rate of change information. The temporal rate of change information indicates a rate of change of the radio channel property of the channel between the terminal and the plurality of antennas. For example, the temporal rate of change information may be determined based on pilot signals from the terminal as will be described below in detail.

If the temporal rate of change information is varying less than a predefined amount over at least a predefined period of time, the base station determines that the radio channel property between the terminal and the plurality of antennas is constant over a period of time. For example, the radio channel property may comprise a signal strength or a phase. The predefined amount may comprise a relative value such that it is determined that the radio channel property is constant over a period of time if the signal strength is varying less than a few percentage, for example less than 5% over at least a predefined period of time, for example one second. Furthermore, the signal phase may be considered such that it is determined that the radio channel property is constant over a period of time if the phase is varying less than a few degree, for example less than 5 degree, over at least a predefined period of time, of for example a few seconds, for example one second. Thus, the base station is enabled to determine whether the radio channel property is constant over a period of time without any modifications to the terminal or other base stations.

For determining the temporal rate of change information at the base station, the base station may receive a plurality of pilot signals from the terminal in a temporal sequence. Furthermore, the base station may determine a plurality of radio channel properties, wherein each radio channel property of the plurality of ratio channel properties is associated to a corresponding pilot signal of the plurality of pilot signals. Then, each radio channel property is determined based on its associated pilot signal. The temporal rate of change information of the radio channel property is finally determined by the base station based on the plurality of radio channel properties. A varying of the radio channel property may be determined based on the plurality of radio channel properties. As the pilot signals from the terminal are used as a basis for determining whether the radio channel property between the terminal and the plurality of antennas of the base station is constant, existing protocols and signalling frames of a MIMO system can be utilized and need not to be modified. Hence, the method may be easily implemented at the base station only.

For achieving the nulling of pilot signals from the terminal, the receiving parameters of the plurality of antennas of the base station may be configured such that signals from the plurality of antennas are combined and/or filtered to cancel the pilot signal received from the terminal. Usually, in MIMO systems, combining and filtering of signals from the plurality of antennas is used to focus a receive direction of the plurality of antennas to a specific terminal to enhance reception sensitivity and quality. According to this embodiment, this effect is used in an inverse manner for nulling pilot signals from the terminal. However, no modifications to the plurality of antennas or the associated transceivers are required such that the method may be implemented with an updated software in existing base stations.

According to another embodiment, the base station transmits a further constant channel information to a further base station, if the base station has determined that the radio channel property between the terminal and the plurality of antennas is constant over a period of time. The further constant channel information indicates that the radio channel property between the terminal and the plurality of antennas of the base station is constant over a period of time. In other words, the base station informs another base station about the fact that the base station has determined that the radio channel property between the terminal and the base station is constant, for example as the terminal is stationary. This information may be used by the further base station for nulling pilot signals from the terminal.

According to another aspect of the present invention, a method for allocating resources for a transmission of pilot signals of a plurality of terminals of a cellular multiple-input and multiple-output (MIMO) system is provided. The cellular MIMO system comprises a base station having a plurality of antennas and a logic which analyses pilot signals received from a terminal at the plurality of antennas to obtain information about a radio channel property of the radio channel between the terminal and the plurality of antennas. According to the method, the base station determines whether the radio channel property between the terminal and the plurality of antennas is constant over a period of time. If the base station has determined that the radio channel property between the terminal and the plurality of antennas is constant over a period of time, the base station transmits a constant channel information to a further base station. The constant channel information indicates that the radio channel property between the terminal and the plurality of antennas of the base station is constant over a period of time and therefore the further base station may reuse a resource, which is assigned to the terminal for a transmission of pilot signals, for another terminal.

However, according to an embodiment the base station may listen to the "nulled" terminal in predefined terms to make sure that the "nulling" is efficient or if the channel has changed. For example, the base station may listen to the "nulled" terminal in cyclic intervals, or based on pilot contamination detection event.

In many MIMO applications, for example in office buildings, shopping malls or sports arenas, a large number of terminals is present and therefore a large number of resources for transmitting pilot signals is required. However, some of the terminals may be stationary, such that the radio channel property between those terminals and antennas of a base station may be constant. According to the above-described method, the base station determines terminals in such conditions and forwards a corresponding information to a further base station. The further base station may use this information for nulling pilot signals originating from those terminals and for reusing the resource in its own cell for transmitting pilot signals from another terminal to the further base station. The constant channel information may comprise information relating to the resource as well as to the terminal, for example a terminal identifier. Furthermore, the constant cannel information may comprise location information of the terminal such that the further base station may configure its receiving parameters of the plurality of antennas such that pilot signals originating from the terminal are ignored by filtering or nulling.

Furthermore, the constant cannel information may only be transmitted to the further base station, if a cell load in a cell of the base station or the further base station is above a predefined threshold or if the further base station requests it.

According to an embodiment, the base station receives a movement information from the terminal and determines whether the radio channel property between the terminal and the plurality of antennas is constant over a period of time depending on the movement information. The movement information indicates whether the terminal is moving or is stationary. In case the base station itself is stationary, like in many environments, for example in office buildings or shopping malls, the radio channel property between the terminal and the antennas of the base station is constant as long as the terminal is not moving. Therefore, the movement information may be utilized advantageously for estimating whether the radio cannel property between the terminal and the plurality of antennas is constant or not.

According to another embodiment, the base station determines whether the radio channel property between the terminal and the plurality of antennas is constant over a period of time by determining the temporal rate of change information. The temporal rate of change information indicates a rate of change of the radio channel property of the channel between the terminal and the plurality of antennas. The temporal rate of change information may be determined for example by monitoring properties of the radio channel over a period of time. In particular, the base station may receive a plurality of pilot signals from the terminal in a temporal sequence. Furthermore, the base station may determine a plurality of radio channel properties, wherein each radio channel property of the plurality of radio channel properties is associated to a corresponding pilot signal of the plurality of the pilot signals. Each radio channel property is determined based on its associated pilot signal. Then, the base station determines the temporal rate of change information of the radio channel property based on the plurality of radio channel properties. The radio channel property may relate to a signal strength or a phase information of the received pilot signal. If the temporal rate of change information is varying less than a predefined amount over a predefined period of time, the base station determines that the radio channel property between the terminal and the plurality of antennas is constant over a period of time. For example, if the base station is a moving base station, arranged at a train or ship or if the base station is arranged in an environment with rapidly moving environmental conditions, for example in a street canyon with a lot of traffic, there may be still terminals arranged such that the radio channel property of the channel between the terminal and the base station is more or less constant over a longer time. This may be determined by the base station by monitoring the radio channel property over a predefined period of time, for example a few seconds. In case the radio channel property does not vary significantly, in particular less than a predefined amount which may be defined as a relative value, the base station may determine that the radio channel property is constant and therefore this information may be forwarded to the further base station for purposes described above.

According to another aspect of the present invention, a base station for a cellular multiple-input and multiple-output (MIMO) system is provided. The base station comprises a plurality of antennas and a logic coupled to the plurality of antennas. The plurality of antennas may be arranged in a two-dimensional or three-dimensional array. The logic is configured to analyse pilot signals received from a terminal at the plurality of antennas to obtain information about a radio channel property between the terminal and the plurality of antennas. The logic is furthermore configured to determine whether the radio channel property between the terminal and the plurality of antennas is constant over a period of time. If the logic has determined that the radio channel property between the terminal and the plurality of antennas is constant over a period of time, the logic configures receiving parameters of the plurality of antennas for nulling pilot signals from the terminal and allocates a resource, which is assigned to the terminal for the transmission of pilot signals of the terminal, to another terminal for a transmission of pilot signals of the other terminal. Thus, in case the radio channel property between the terminal and the base station does not change significantly over a period of time, the base station ignores further pilot signals from the terminal by nulling them and reuses the resource for a transmission of pilot signals from another terminal. Thus, the limited resources for pilot signals may be used more efficiently in a MIMO system.

The base station may be configured to perform the above described method and the embodiments thereof. Therefore, the base station also comprises the above described advantages.

According to a further aspect of the present invention, a base station for a cellular multiple-input and multiple-output (MIMO) system is provided. The base station comprises a plurality of antennas which may be arranged in a two- or three-dimensional array. The base station comprises furthermore a logic which is coupled to the plurality of antennas and which is configured to analyse pilot signals received from a terminal at the plurality of antennas to obtain information about a radio channel property between the terminal and the plurality of antennas. The logic is furthermore configured to determine whether the radio channel property between the terminal and the plurality of antennas is constant over a period of time. In case the logic determines that the radio channel property between the terminal and the plurality of antennas is constant over a period of time, the logic transmits a constant channel information to a further base station. The constant channel information indicates that the radio channel property between the terminal and the plurality of antennas of the base station is constant over a period of time, such that a resource assigned to the terminal for the transmission of pilot signals is reusable by the further base station for another terminal. Thus, the resources for transmitting the pilot signals may be used more efficiently in a MIMO system.

The base station may be configured to perform the above-described method or any one of the method's embodiments described above and comprises therefore the above-described advantages.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
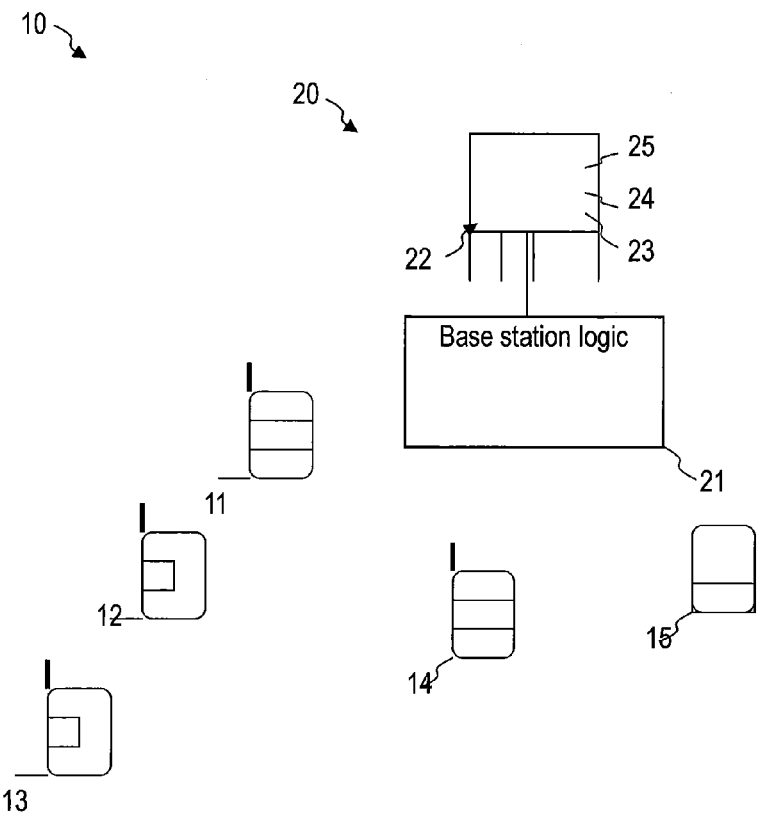
FIG. 1 shows schematically a base station and terminals according to embodiments of the present invention.

FIG. 1 shows a communication system 10 according to an embodiment. The communication system 10 is a multiple-input and multiple-output (MIMO) system and includes a MIMO base station 20 according to an embodiment. The MIMO communication system 10 may be a massive MIMO system (MaMi), and the MIMO base station may have a large number of antennas, for example several tens or in excess of one hundred antennas.

The base station 20 comprises a plurality of antennas 22. The antennas 23-25 may be arranged in a two-dimensional or three-dimensional spatial array on a carrier. The base station 20 may comprise furthermore associated (not shown) transceivers for the antennas 23-25. The base station 20 may be a base station for a massive MIMO system. Accordingly, the base station 20 may have several tens or in excess of one hundred antennas 23-25. The plurality of antennas may also be spatially distributed to various locations, for example in a cooperative MIMO. It is further possible that several base stations interact in cooperative MIMO, with the plurality of antennas being distributed over various locations.

In the communication system 10, a plurality of terminals 11 to 15 may be arranged. The terminals 11 to 15 may be configured to communicate with the base station 20. Each one of the terminals 11 to 15 is configured to transmit a pilot signal to the base station 20. The pilot signal may respectively include a training sequence. The pilot signal may be a MIMO pilot signal.

The base station 20 is configured to analyse the pilot signal received at the plurality of antennas 22 of the base station 20 to determine a channel characteristics for a radio signal transmission between the plurality of antennas 22 of the base station 20 and the respective terminal 11 to 15. A logic 21 of the base station 20 may be configured to determine a footprint matrix based on the pilot signal received by the plurality of antennas 22 from a terminal. The logic 21 may use the footprint matrix to control the plurality of antennas 22 when transmitting radio signals to the respective terminal. The logic 21 may compute a Hermitian conjugate of the footprint matrix to determine a time delay and amplitudes of radio signals transmitted by each antenna 23-25 of the plurality of antennas 22 to focus radio energy in a sector in which the respective terminal is located. Vice versa, when the base station 20 is receiving a radio signal from a terminal, the signals received at each antenna 23-25 of the plurality of antennas 22 are filtered, combined and/or delayed such that the radio signal from the respective terminal may be received with a large amplitude and signal to noise ratio.

The MIMO system 10 may use a time division multiple access method (TDMA) for the transmission of pilot signals. A pilot time slot may be allocated to each terminal 11-15 in which the respective terminal may transmit its pilot signal. The allocation in the time domain ensures that the various terminals 11-15 do not interfere with each other when transmitting the pilot signals. However, other orthogonal transmission methods may be used for transmitting the pilot signals, for example a frequency division multiple access (FDMA) or a code division multiple access (CDMA) method.

Figure 2:
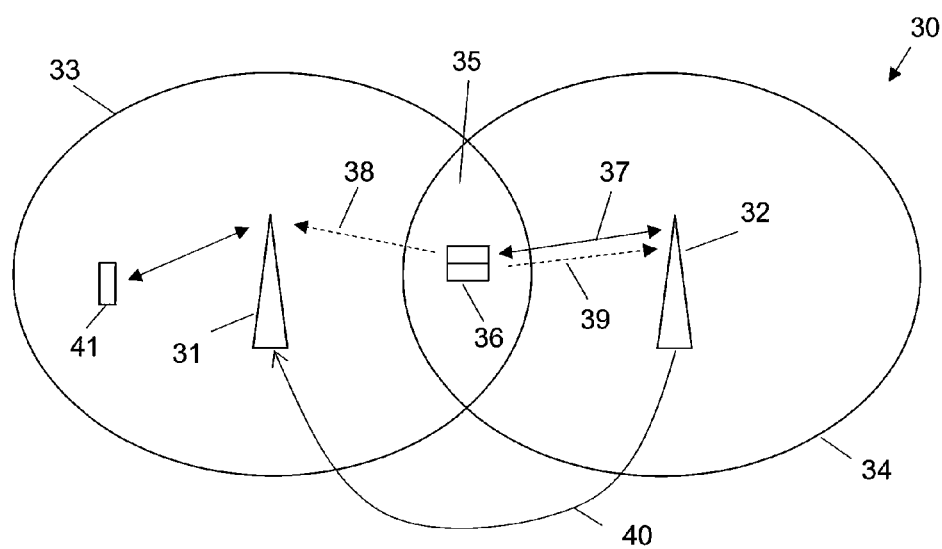
FIG. 2 shows schematically an arrangement of two base stations and terminals according to embodiments of the present invention.

FIG. 2 shows schematically a multiple-input and multiple-output (MIMO) communication system 30 comprising a first base station 31 and a second base station 32. The base stations 31, 32 may have a similar or identical structure as the base station 20 described above in connection with FIG. 1. The first base station 31 covers and serves a first cell 33 and the second base station 32 covers and serves a second cell 34. The cells 33 and 34 are overlapping in an overlapping area 35. A terminal, for example a terminal equipment of a user, for example a mobile telephone, a mobile tablet computer, a stationary computer or a cash register, which is arranged within cell 33 may register at base station 31. A terminal arranged within cell 34 may register at the second base station 32. Consequently, a terminal which is arranged in the overlapping area 35 may register at the first base station 31 or at the second base station 32.

As described above in connection with FIG. 1, a terminal in a MIMO system may transmit a pilot signal such that a base station can determine radio channel properties of a radio channel between the base station and the terminal for enhancing communication between the terminal and the base station. However, when a terminal is arranged in the overlapping area 35, the pilot signal will be present in both cells 33 and 34. FIG. 2 shows an exemplary terminal 36 which is arranged in the overlapping area 35 which may be registered at the second base station 32, indicated by the solid arrow 37. However, when transmitting pilot signals, these may be received and the first base station 31 as well as at the second base station 32 as indicated by arrows 38 and 39. Therefore, the resource allocated for transmitting the pilot signal from the terminal 36 cannot be used within cell 33, although terminal 36 is registered at the second base station 32 in the cell 34.

For improving the use of resources for pilot signal transmission, the base stations 31 and 32 may perform in their corresponding base station logics 21 the methods described below in connection with FIGS. 3 and 4. Although in the following description the method of FIG. 3 is performed by the first base station 31 and the method of FIG. 4 is performed by the second base station 32, each of the base stations 31, 32 may perform anyone of the methods of FIGS. 3 and 4 or both.

Figure 3:
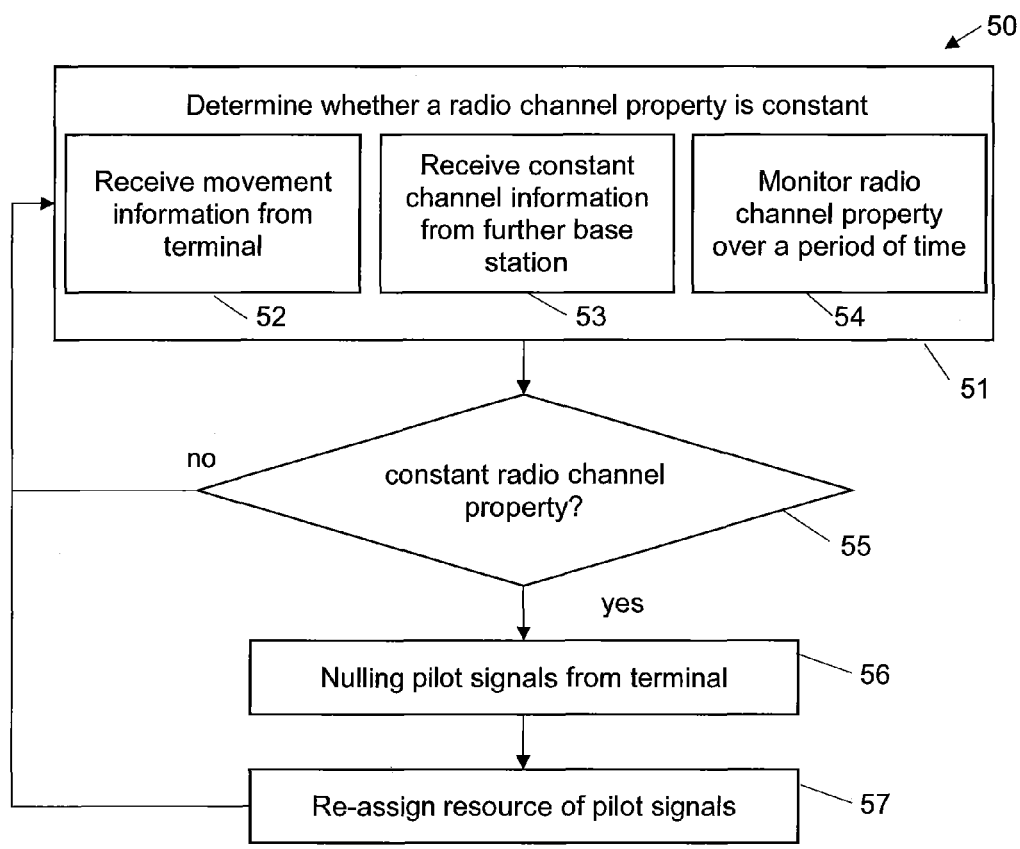
FIG. 3 shows a flow chart comprising method steps for allocating resources for a transmission of pilot signals according to an embodiment of the present invention.
Figure 4:
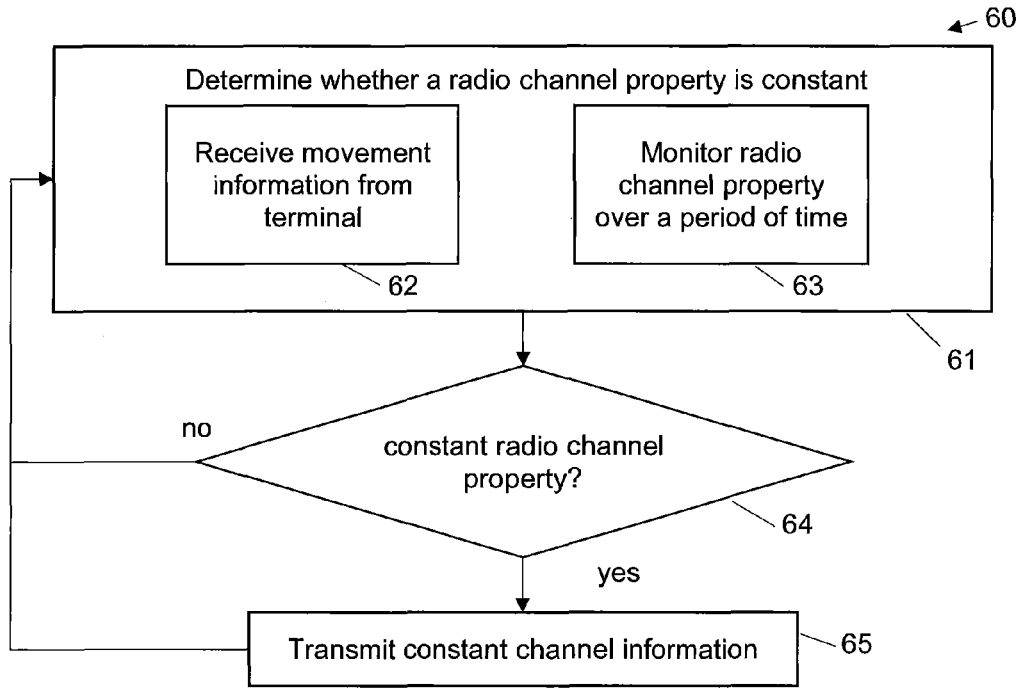
FIG. 4 shows a flow chart comprising method steps for allocating resources for a transmission of pilot signals according to another embodiment of the present invention.

FIG. 3 shows a method 50 comprising method steps 51 to 57 which may be executed by the base station logic 21 of the first base station 31. In step 51 the base station 31 determines whether a radio channel property between the base station 31 and the terminal 36 is constant. A radio channel property may vary due to a movement of the terminal 36, a movement of the first base station 31, a relative movement of the first base station 31 and the terminal 36 with respect to each other, or a change in an environment influencing the radio channel between the terminal 36 and the first base station 31, for example due to a movement of vehicles in a street canyon. However, depending on the environment and the scenario, there may be several ways for the first base station 31 to determine whether the radio channel property is constant.

For example, the first base station 31 may receive in step 52 a movement information from the terminal 36. The terminal 36 may indicate that it is a stationary device. In case the first base station 31 itself is also a stationary device and no significant environmental changes are expected, this information received from the terminal 36 may indicate that the radio channel property between the terminal 36 and the first base station 31 will remain constant at least over a period of time.

Additionally, or as an alternative, the first base station 31 may receive in step 53 a constant channel information from the second base station 32. The second base station 32 may have determined as will be described below in connection with FIG. 4, whether the radio channel property between the second base station 32 and the terminal 36 is constant. In case the first base station 31 and the second base station 32 are also stationary base stations or move in the same way, the constant channel information may indicate to the first base station 31 indirectly that the radio channel property between the terminal 36 and this first base station 31 is also constant over at least a period of time. The constant channel information may be transmitted via a connection 40 from the second base station 32 to the first base station 31 as shown in FIG. 2. The connection 40 may be a wireless or wired connection connecting the base stations 31 and 32.

Additionally, or as an alternative, the first base station 31 may monitor the radio channel property between the first base station 31 and the terminal 36 over a period of time (step 54). For example, the first base station 31 may receive a plurality of pilot signals from the terminal 36 in a temporal sequence and may analyse these pilot signals to determine if the radio channel property is varying within predefined limits or not over at least a predefined period of time.

Based on the determination of step 51, the first base station 31 determines in step 55 if the radio channel property is constant or not. If the radio channel property is not constant, step 51 may be performed again for terminal 36 or any other terminal within cell 33 until a terminal is found whose radio channel property is constant over a period of time. If, in step 55, the first base station 31 determines that the radio channel property is constant over at least a period of time, the first base station 31 may configure receiving parameters of the plurality of antennas of the first base station 31 or nulling pilot signals from the terminal 36. Nulling is a technique used to make the antenna array 32 blind to signals originating from specific devices, for example from the terminal 36. As the radio channel property between the first base station 31 and the terminal 36 is constant over at least a period of time, the pilot signals need not be received by the first base station 31 with the same intensity or frequency and hence will be valid for a longer time. This enables the first base station 31 to null the stationary terminal 36 also during the pilot signal transmission phase. Thus, the first base station 31 may reuse in step 57 the very same resource used by the terminal 36 for transmitting pilot signals by another terminal, for example the terminal 41 in FIG. 2. In other words, the first base station 31 creates the "digital" shield in the direction of the terminal 36 and reuses the resource for a pilot signal transmission from terminal 41.

As described above in step 53, a constant channel information may be received from the second base station 32. For example, a standardized communication between the base stations 31, 32 may be established where resources of pilot signals of stationary devices are shared. For example, as shown in FIG. 4, the second base station 32 may execute the method 60 comprising method steps 61 to 65. In step 61 the second base station 32 may determine whether a radio channel property to a terminal, for example terminal 36, is constant over a period of time. For accomplishing this, the second base station 32 may receive a movement information from the terminal 36 in step 62. Additionally, or as an alternative, the second base station 32 may monitor the radio channel property of the radio channel between the terminal 36 and the second base station 32 over a period of time (step 63). If the radio channel property is not constant (step 64) the method continues in step 61 for searching whether a radio channel property of a terminal within the cell 34 is constant over a period of time. If the second base station 32 has determined that the radio channel property of the radio channel between the terminal 36 and the second base station 32 is constant over a period of time (step 64), the second base station 32 transmits a corresponding constant channel information over the connection 40 to the first base station 31 in step 65. The first base station 31 may use this constant channel information for shielding or nulling pilot signal from the terminal 36 and to reassign the resource to terminal 41.

The invention claimed is:

1. A method of allocating resources for a transmission of pilot signals of a plurality of terminals of a cellular multiple-input and multiple-output, MIMO, system, the cellular MIMO system comprising a base station having a plurality of antennas and a logic which analyzes pilot signals received from a terminal at the plurality of antennas to obtain information about a radio channel property of the radio channel between the terminal and the plurality of antennas, the method comprising:
   determining, by the base station, whether the radio channel property between the terminal and the plurality of antennas is constant over a period of time, and
   if the radio channel property between the terminal and the plurality of antennas is constant over a period of time:
      configuring, by the base station, receiving parameters of the plurality of antennas of the base station for nulling pilot signals from the terminal, and
      allocating a resource, which is assigned to the terminal for a transmission of pilot signals of the terminal, to another terminal for a transmission of pilot signals of the other terminal during the nulling pilot signals from the terminal.

2. The method according to claim 1, wherein determining, by the base station, whether the radio channel property between the terminal and the plurality of antennas is constant over a period of time, comprises:
   receiving, at the base station, a movement information from the terminal, the movement information indicating whether the terminal is moving or is stationary, and
   determining that the radio channel property between the terminal and the plurality of antennas is constant over a period of time depending on the movement information.

3. The method according to claim 1, wherein determining, by the base station, whether the radio channel property between the terminal and the plurality of antennas is constant over a period of time, comprises:
   receiving, at the base station, a constant channel information from a further base station, the constant channel information indicating that a radio channel property between the terminal and a plurality of antennas of the further base station is constant over a period of time, and
   determining that the radio channel property between the terminal and the plurality of antennas of the base station is constant over a period of time depending on the constant channel information.

4. The method according to claim 1, wherein determining, by the base station, whether the radio channel property between the terminal and the plurality of antennas is constant over a period of time, comprises:
   determining, by the base station, a temporal rate of change information, the temporal rate of change information indicating a rate of change of the radio channel property of the channel between the terminal and the plurality of antennas, and
   determining that the radio channel property between the terminal and the plurality of antennas is constant over a period of time if the temporal rate of change information is varying less than a predefined amount over at least a predefined period of time.

5. The method according to claim 4, wherein determining, by the base station, the temporal rate of change information comprises:
   receiving, at the base station, a plurality of pilot signals from the terminal in a temporal sequence, determining, by the base station, a plurality of radio channel properties, wherein each radio channel property of the plurality of radio channel properties is associated to a corresponding pilot signal of the plurality of pilot signals, wherein each radio channel property is determined based on its associated pilot signal, and determining, by the base station, the temporal rate of change information of the radio channel property based on the plurality of radio channel properties.

6. The method according to claim 1, wherein configuring the receiving parameters of the plurality of antennas of the base station for nulling pilot signals from the terminal comprises:

combining and/or filtering signals from the plurality of antennas for cancelling the pilot signal received from the terminal.

7. The method according to claim 1, further comprising if the radio channel property between the terminal and the plurality of antennas is constant over a period of time:

transmitting, by the base station, a further constant channel information to a further base station, the further constant channel information indicating that the radio channel property between the terminal and the plurality of antennas of the base station is constant over a period of time.

8. A method of allocating resources for a transmission of pilot signals of a plurality of terminals of a cellular multiple-input and multiple-output, MIMO, system, the cellular MIMO system comprising a base station having a plurality of antennas and a logic which analyzes pilot signals received from a terminal at the plurality of antennas to obtain information about a radio channel property of the radio channel between the terminal and the plurality of antennas, the method comprising:

determining, by the base station, whether the radio channel property between the terminal and the plurality of antennas is constant over a period of time, and if the radio channel property between the terminal and the plurality of antennas is constant over a period of time:

transmitting, by the base station, a constant channel information to a further base station, the constant channel information indicating that the radio channel property between the terminal and the plurality of antennas of the base station is constant over a period of time suet' indicating that a resource assigned to the terminal for a transmission of pilot signals is reusable by the further base station for another terminal, and configuring, by the base station, receiving parameters of the plurality of antennas of the base station for nulling pilot signals from the terminal while reusing the resource by the further base station for another terminal.

9. The method according to claim 8, wherein determining, by the base station, whether the radio channel property between the terminal and the plurality of antennas is constant over a period of time, comprises:

receiving, at the base station, a movement information from the terminal, the movement information indicating whether the terminal is moving or is stationary, and determining that the radio channel property between the terminal and the plurality of antennas is constant over a period of time depending on the movement information.

10. The method according to claim 8, wherein determining, by the base station, whether the radio channel property between the terminal and the plurality of antennas is constant over a period of time, comprises:

determining, by the base station, a temporal rate of change information, the temporal rate of change information indicating a rate of change of the radio channel property of the channel between the terminal and the plurality of antennas, and determining that the radio channel property between the terminal and the plurality of antennas is constant over a period of time if the temporal rate of change information is varying less than a predefined amount over a predefined period of time.

11. The method according to claim 10, wherein determining, by the base station, the temporal rate of change information comprises:

receiving, at the base station, a plurality of pilot signals from the terminal in a temporal sequence, determining, by the base station, a plurality of radio channel properties, wherein each radio channel property of the plurality of radio channel properties is associated to a corresponding pilot signal of the plurality of pilot signals, wherein each radio channel property is determined based on its associated pilot signal, and determining, by the base station, the temporal rate of change information of the radio channel property based on the plurality of radio channel properties.

12. A base station for a cellular multiple-input and multiple-output, MIMO, system, the base station comprising:

a plurality of antennas, and a logic coupled to the plurality of antennas and configured to analyze pilot signals received from a terminal at the plurality of antennas to obtain information about a radio channel property between the terminal and the plurality of antennas, determine whether the radio channel property between the terminal and the plurality of antennas is constant over a period of time, and if the radio channel property between the terminal and the plurality of antennas is constant over a period of time:

configure receiving parameters of the plurality of antennas for nulling pilot signals from the terminal, and allocate a resource, which is assigned to the terminal for the transmission of pilot signals of the terminal, to another terminal for a transmission of pilot signals of the other terminal during the nulling pilot signals from the terminal.

13. A base station for a cellular multiple-input and multiple-output, MIMO, system, the base station comprising:

a plurality of antennas; and a logic coupled to the plurality of antennas and configured to analyze pilot signals received from a terminal at the plurality of antennas to obtain information about a radio channel property between the terminal and the plurality of antennas, determine whether the radio channel property between the terminal and the plurality of antennas is constant over a period of time, and if the radio channel property between the terminal and the plurality of antennas is constant over a period of time:

transmit a constant channel information to a further base station, the constant channel information indicating that the radio channel property between the terminal and the plurality of antennas of the base station is constant over a period of time indicating that a resource assigned to the terminal for a transmission of pilot signals is reusable by the further base station for another terminal, and configure, by the base station, receiving parameters of the plurality of antennas of the base station for nulling pilot signals from the terminal while reusing the resource by the further base station for another terminal.

\* \* \* \* \*

UNITED STATES PATENT AND TRADEMARK OFFICE
CERTIFICATE OF CORRECTION

PATENT NO. : 9,974,078 B2
APPLICATION NO. : 15/099996
DATED : May 15, 2018
INVENTOR(S) : Erik Bengtsson Page 1 of 1

It is certified that error appears in the above-identified patent and that said Letters Patent is hereby corrected as shown below:

In the Claims

Column 13, Claim 8, Line 47: Please delete "suet"

Signed and Sealed this
Thirty-first Day of July, 2018

Andrei Iancu
*Director of the United States Patent and Trademark Office*